F. DUHSEL.
BEET HARVESTER.
APPLICATION FILED JULY 10, 1912.
1,074,610.
Patented Oct. 7, 1913.
3 SHEETS—SHEET 1.
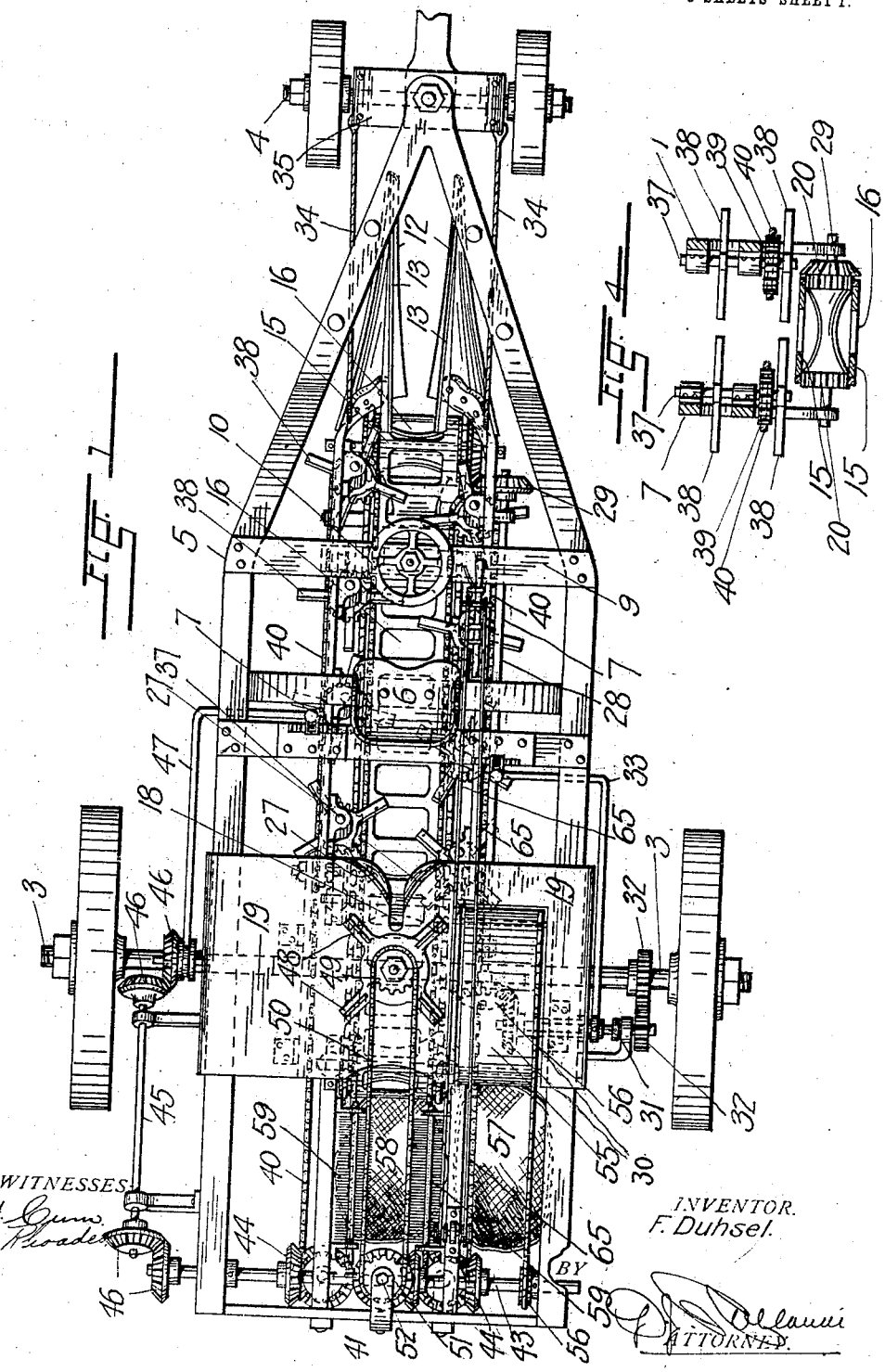

F. DUHSEL.
BEET HARVESTER.
APPLICATION FILED JULY 10, 1912.
1,074,610.
Patented Oct. 7, 1913.
3 SHEETS—SHEET 2.
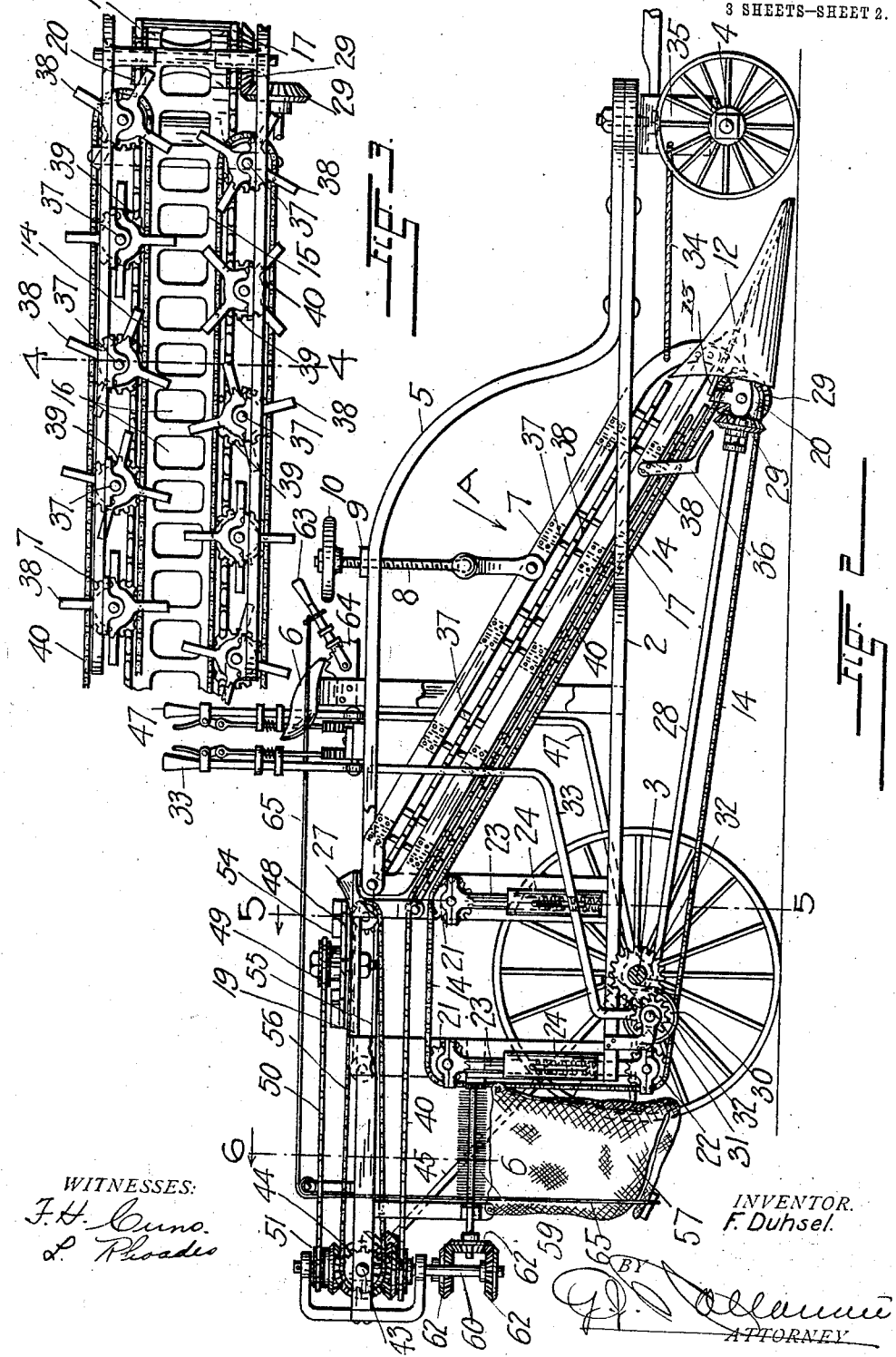
WITNESSES:
F.H. Cuno
L. Rhoades
INVENTOR.
F. Duhsel.
BY
ATTORNEY

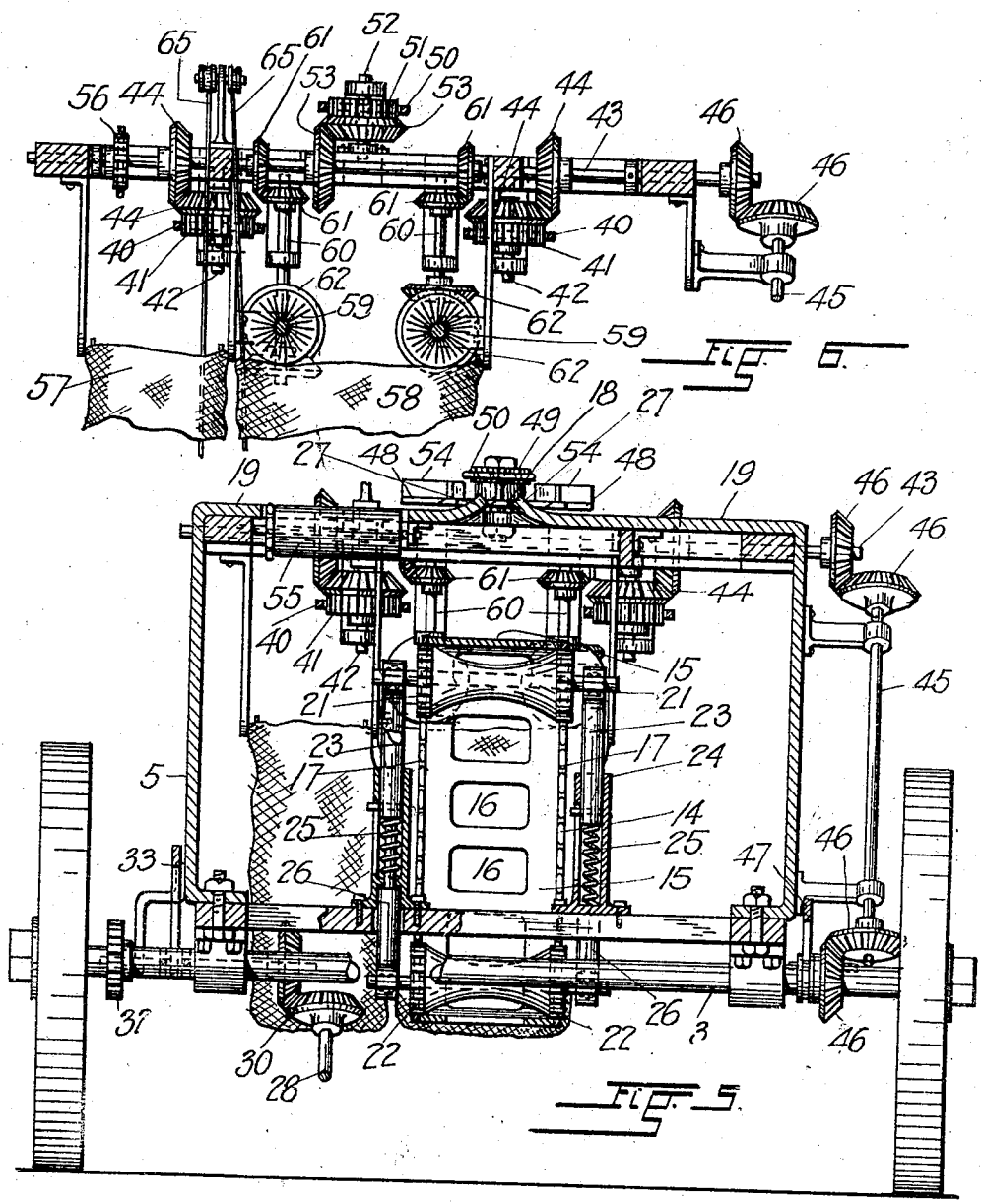

UNITED STATES PATENT OFFICE.

FERDINAND DUHSEL, OF DENVER, COLORADO.

BEET-HARVESTER.

1,074,610. Specification of Letters Patent. Patented Oct. 7, 1913.

Application filed July 10, 1912. Serial No. 708,639.

*To all whom it may concern:*

Be it known that I, FERDINAND DUHSEL, a subject of William II, Emperor of Germany, having declared my intention of becoming a citizen of the United States, residing at Denver, in the county of Denver and State of Colorado, have invented certain new and useful Improvements in Beet-Harvesters, of which the following is a specification.

My invention relates to improvements in beet harvesters and its object resides in the provision of a machine of simple construction which while being advanced along the rows of plants in a beet field will successively lift the beets out of the ground, sever the lower parts of the roots, cut the tops off of the beets, separate the severed tops from the roots and deposit both these products in separate receptacles after the beets have been cleaned of sand and other adherent matter. I attain this object by the mechanism illustrated in the accompanying drawings in the various views of which like parts are similarly designated and in which, Figure 1 represents a plan view of my improved harvester, Fig. 2, a side elevation of the same, Fig. 3, a fractional plan view of the conveyer employed in the machine, looking in the direction of the arrow A, Fig 2, Fig. 4, a section taken along the line 4—4, Fig. 3, Fig. 5 a transverse section taken along the line 5—5, Fig. 2 drawn to an enlarged scale, and Fig. 6, a similar section taken along the line 6—6, Fig. 2.

Referring to the drawings by numerals, 2 designates a truck frame supported upon the wheeled axles 3 and 4 and carrying a superstructure 5 upon which the greater part of the operating mechanism is mounted, and a seat 6 for the driver and operator of the machine.

Pivotally mounted at its upper end on the frame which constitutes the superstructure, is a conveyer trough 7 which is adjustably suspended from a screw 8 which extends through a correspondingly threaded opening of a cross-strap 9 on the frame 5 and which at its upper end is provided with a hand wheel 10.

The trough 7 carries at its lower end a pair of plow shares 12 which in the operation of the invention dig the beet plants out of the ground and by means of upturned flanges 13 guide them onto an endless belt conveyer 14 which has an upward movement along the longitudinally slotted bottom of the trough. This conveyer consists of a pair of parallel chains 17 which are connected to the opposite sides of a belt 15 which has a series of openings 16 in which, in the operation, the beet plants are received and carried upwardly into the open, flaring end of a slot 18 formed in the front edge of a platform 19 which is disposed at the rear end of the superstructure 5. The conveyer chains 17 are moved over sprocket wheels 20 at the lower end of the trough 7, two pairs of similar wheels 21 below the platform 19 and a fourth pair of wheels 22 disposed beneath the truck frame. The two pairs of wheels 21 are carried upon shafts which are rotatably mounted in bearings at the upper ends of standards 23 which are vertically movably fitted in cylinders 24 fastened on the truck frame, and supported upon coiled springs 25 placed within the same. The pair of sprocket wheels 22 disposed below the truck frame are carried on a shaft which is mounted in bearings on hangers 26 which extend upwardly through openings in the bottoms of the rearmost pair of cylinders 24 and are connected with the respective standards 23. The conveyer being thus yieldingly supported at its rear portion will move up and downwardly to automatically vary the distance between its upper surface and the platform in accordance with the size of the beets it carries into the slot 18. The roots of the beets vary many pounds in weight and consequently will extend above the surface of the belt at diferent heights.

When entering the flaring mouth of the slot in the platform the upper portions of the roots engage the upturned sides 27 of the same, and while moving underneath the platform force the conveyer downwardly in accordance with their height above the upper surface of the belt thereof, so that irrespective of the size of the beet plants carried in the openings 16 of the belt, their roots will always move beneath the platform while their leaves project through the slot to be severed from the roots by the action of a rotary knife which is mounted on the upper surface of the platform, as will hereinafter be described. The downward movement of the lower pair of sprocket wheels 22 will take up the slack of the conveyer which otherwise would be caused by reason of the downward movement of its upper portion. The conveyer is operated during forward movement of the truck by means of a shaft 28 which is connected with the shaft of the pair of sprocket wheels 20 at the forward end of the trough through the medium of a pair of beveled gear wheels 29, and which receives its rotary movement from the rear axle 3 through the instrumentality of another pair of beveled gear wheels 30, one of which is mounted at the end of the shaft 28 and the other on a counter shaft 31 which is operatively connected with the rear axle by means of a pair of gears 32. One of the beveled gear wheels 30 is slidingly mounted on the shaft 31 and connected with a lever 33 which extending within reach of the operator on the seat 6, is used to shift the said gear in and out of mesh with the corresponding gear on the shaft 28. Cables 34 connect the lower end of the conveyer trough 7 with the forward truck-bolster 35 and knives 36 are attached to the said trough rearward of the plow shares 12 to cut off the lower portions of the roots while the beet plants are moved upwardly on the conveyer.

To maintain the beets in an upright position while they travel upwardly with the conveyer toward the slot 18, I have arranged on the sides of the conveyer trough, two series of sustaining devices each consisting of a rotary shaft 37 extending at right angles to the bottom of the trough, two sets of arms 38 which extend radially from the shaft 37 and a sprocket wheel 39 which like the sets of arms, is fixedly mounted on the shaft 37.

The rotary devices on one side of the trough are placed alternately with respect to those on the other side of the same so that when the arms of the devices of one of the series release a beet plant carried upwardly on the conveyer, those of the shafts at the opposite side of the trough will immediately engage the same.

Two endless sprocket chains 40 mounted to engage the wheels 39 on the shafts of the two series of rotary sustaining devices are in the operation of the machine impelled by means of sprocket wheels 41 on shafts 42 which are suspended from an extension at the rear end of the superstructure and which are rotated through the instrumentality of a line shaft 43 which is mounted on the same extension and which is operatively connected with the shaft 42 by means of beveled gear wheels 44.

The shaft 43 is while the machine is in motion, rotated from the rear axle 3 through the medium of a shaft 45 which is connected with the said axle and with the said line shaft by means of two pairs of beveled gear wheels 46. The gear wheel 46 on the axle 3 is slidably mounted thereon and connected with a lever 47 which extending in proximity to the operator's seat 6 is used to shift the said gear in and out of engagement with the other gear of the pair.

The knife which severs the leaves of the beets extending through the slot 18 above the platform, from the roots, which are carried by the conveyer underneath the same, consists of a set of four blades 48 which extend radially from a common hub rotatably mounted upon the platform. A sprocket wheel 49 connected with the hub of the rotary knife is operatively engaged by a chain 50 which runs around a sprocket wheel 51 on an upright stud shaft 52 placed intermediate the shafts 42 and connected with the line shaft by means of a pair of beveled gear wheels 53.

By the rotary motion of the sprocket wheel 49 the blades of the knife are moved across the slot 18 and sever the leaves extending therethrough from the roots held on the conveyer. Upturned flanges 54 on these blades project the severed leaves onto an endless belt 55 whose upper surface is flush with that of the platform and which being operated by means of a sprocket chain 56 from the line shaft, carries the leaves into the open mouth of a sack 57 which is suspended from the rear end of the superstructure of the machine. The roots are after having been topped by the action of the rotary knife, carried rearwardly to be deposited in another sack 58 which likewise is suspended from the frame of the machine. Before entering the sack, however, the roots are subjected to the cleaning action of a pair of brushes 59 which are mounted to rotate about parallel axes above the mouth of the sack 58 and which receive their rotary movement from the line shaft through the medium of two upright shafts 60 which are connected with the line shaft and with the respective brush shafts by means of pairs of beveled gears 61 and 62, as is best shown in Fig. 6 of the drawings.

The bags are provided with hinged bottoms which are normally held in the closed position by means of a lever 63 on a segment 64, with which they are connected by means of cords 65. This lever is positioned within easy reach of the operator on the seat 6 so that the contents of the two sacks may be dumped upon the ground whenever desired.

Having thus described the mechanical construction of my improved harvester, its operation will be readily understood. The machine being drawn along a row of beets by draft animals hitched in front thereof, lifts the beets out of the ground by means of the plow shares whose upwardly extending flanges guide the beet plants into the openings in the belt of the conveyer after which their lower ends will be severed by engagement with the knives 36. During their sub- sequent upward movement they are maintained in an upright position by engagement with the arms of the series of rotary sustaining devices on the sides of the conveyer trough, the lower sets of said arms engaging the smaller beets only, while the larger beets are engaged by both sets of arms on each shaft. Upon reaching the flaring entrance to the slot 18 the beets by engagement with the upturned edges 27 thereof, move underneath the platform 19 while depressing the upper portion of the conveyer in accordance with their varying sizes, the rotary knife severs the leaves which project through the slot, from the roots and moves them onto the endless belt which conveys them into the sack 57 while the roots are at the same time carried onto the brushes 59 which by their rotary movement, remove the sand and other adherent matter from the beets before they fall into the sack 58. The driver of the machine controls its operation by means of the levers 33 and 47 which respectively establish the operative connections of the conveyer and the line shaft with the rear axle of the truck, and whenever it is necessary he may dump the contents of the sacks upon the ground without leaving his seat, by manipulation of the lever 63.

Having thus described my invention what I claim and desire to secure by Letters Patent is:

1. A beet harvester comprising in combination with a wheel-supported carrier, means for lifting beets out of the ground over which said carrier is advanced, a knife rearward of said means for severing the roots of the beets, a conveyer for elevating the beets, and a cutter for topping the same.

2. A beet harvester comprising in combination with a wheel supported carrier, means for lifting beets out of the ground over which the carrier is advanced, a conveyer for elevating the beets, series of rotary arms at opposite sides of the conveyer and moving above the same to engage the beets carried thereby, and a cutter for topping the beets.

3. A beet harvester comprising in combination with a wheel supported carrier, means for lifting beets out of the ground over which the carrier is advanced, a conveyer for elevating the beets, series of rotary arms at opposite sides of the conveyer and moving above the same to alternately engage the beets carried thereby, and a cutter for topping the beets.

4. A beet harvester comprising in combination with a wheel-supported carrier, means for lifting beets out of the ground over which the carrier is advanced, a conveyer for elevating the beets, series of rotary devices at opposite sides of the conveyer for maintaining the beets carried thereon in a position at substantially right angles to its surface, means for imparting a rotary movement to said devices, and a cutter for topping the beets, each of said devices comprising arms radiating from its axis of rotation and extending above the conveyer.

5. A beet harvester comprising in combination with a wheel-supported carrier, means for lifting beets out of the ground over which the carrier is advanced, a conveyer for elevating the beets, series of rotary devices at opposite sides of the conveyer for maintaining the beets carried thereon in a position at substantially right angles to its surface, means for imparting a rotary movement to said devices, and a cutter for topping the beets, each of said devices comprising two sets of arms radiating from its axis of rotation and extending above the conveyer at different distances from its surface.

6. A beet harvester comprising in combination with a wheel-supported carrier, means for lifting beets out of the ground over which the carrier is advanced, a conveyer for elevating the beets comprising an endless belt having a series of longitudinally alined openings in which the beets are supported, and a cutter for topping the beets carried on the conveyer.

7. A beet harvester comprising in combination with a wheel-supported carrier, means for lifting beets out of the ground over which the carrier is advanced, a conveyer for elevating the beets comprising an endless belt having a series of longitudinally alined openings in which the beets are supported, means for maintaining beets supported in said openings in a position at substantially right angles to the surface of the belt, and a cutter for topping the beets carried on the conveyer.

8. A beet harvester comprising in combination with a wheel-supported carrier, means for lifting beets out of the ground over which said carrier is advanced, a platform having an open-ended slot, a conveyer for moving beets lifted by said means, into said slot, and a knife having a movement across the slot for severing the tops of the beets projecting through the same.

9. A beet harvester comprising in combination with a wheel-supported carrier, means for lifting beets out of the ground over which said carrier is advanced, a platform having an open-ended slot, a conveyer for moving beets lifted by said means, into said slot, a knife having a movement across the slot for severing the tops of the beets projecting through the same, a receptacle, and means on said platform for moving the severed tops thereinto.

10. A beet harvester comprising in combination with a wheel-supported carrier, means for lifting beets out of the ground over which said carrier is advanced, a platform having an open-ended slot, a conveyer for moving beets lifted by said means, into said slot, a knife having a movement across the slot for severing the tops of the beets projecting through the same, and an endless belt moving on said platform, said knife having means for moving the severed tops onto the said belt.

11. A beet harvester comprising in combination with a wheel-supported carrier, means for lifting beets out of the ground over which said carrier is advanced, a platform having an open-ended slot, a conveyer for moving beets lifted by said means, into said slot, and a knife having a movement across the slot for severing the tops projecting through the same, the said conveyer being yieldingly mounted to move up and downwardly for regulating the distance between it and the platform in accordance with the different heights at which the beets project above the conveyer.

12. A beet harvester comprising in combination with a wheel supported carrier, means for lifting beets out of the ground over which said carrier is advanced, a platform having an open-ended slot, a conveyer for moving beets lifted by said means, into said slot, and a knife having a movement across the slot for severing the tops projecting through the same, the said conveyer being yieldingly mounted to move downwardly by the contact of the beets carried thereon with the lower surface of the platform.

13. A beet harvester comprising in combination with a wheel-supported carrier, means for lifting beets out of the ground over which said carrier is advanced, a platform having an open-ended slot, a conveyer for moving beets lifted by said means into said slot, a knife having a movement across the slot for severing the tops projecting through the same, and spring supported bearings for supporting the conveyer below the platform, whereby it may be moved downwardly by the contact of beets carried thereon, with the bottom surface of the platform.

14. A beet harvester comprising in combination with a wheel supported carrier, means for lifting beets out of the ground over which the carrier is advanced, a conveyer adapted to receive the beets lifted by the said means, and to carry them to a point on the carrier remote from the same, a cutter for topping the beets carried on said conveyer, and means separate from said conveyer for presenting the said beets to the action of the said cutter at substantially right angles to the plane in which the cutting edge of the latter has its movement.

In testimony whereof I have affixed my signature in presence of two witnesses.

FERDINAND DUHSEL.

Witnesses:
 G. J. ROLLANDET,
 L. RHOADES.